United States Patent
Schlaich et al.

(10) Patent No.: US 9,475,200 B2
(45) Date of Patent: Oct. 25, 2016

(54) SAFETY DEVICE FOR A HANDLING APPARATUS, IN PARTICULAR AN INDUSTRIAL ROBOT, AND METHOD FOR OPERATING THE SAFETY DEVICE

(75) Inventors: Peter Schlaich, Leonberg (DE); Joachim Frangen, Heilbronn (DE)

(73) Assignee: ROBERT BOSCH GMBH, Stuttgart (DE)

(*) Notice: Subject to any disclaimer, the term of this patent is extended or adjusted under 35 U.S.C. 154(b) by 66 days.

(21) Appl. No.: 13/995,089

(22) PCT Filed: Dec. 9, 2011

(86) PCT No.: PCT/EP2011/072337
§ 371 (c)(1),
(2), (4) Date: Sep. 3, 2013

(87) PCT Pub. No.: WO2012/080130
PCT Pub. Date: Jun. 21, 2012

(65) Prior Publication Data
US 2013/0338829 A1    Dec. 19, 2013

(30) Foreign Application Priority Data
Dec. 16, 2010 (DE) .................. 10 2010 063 214

(51) Int. Cl.
*B25J 19/06* (2006.01)
*B25J 9/16* (2006.01)
*F16P 3/14* (2006.01)

(52) U.S. Cl.
CPC ............. *B25J 19/06* (2013.01); *B25J 9/1674* (2013.01); *B25J 9/1676* (2013.01); *F16P 3/141* (2013.01); *F16P 3/148* (2013.01); *G05B 2219/39091* (2013.01); *G05B 2219/40559* (2013.01)

(58) Field of Classification Search
CPC ...... B25J 19/06; B25J 9/1674; B25J 9/1676; F16P 3/141; F16P 3/148; G05B 2219/40559; G05B 2219/39091
USPC .................................................. 700/253, 255
See application file for complete search history.

(56) References Cited

U.S. PATENT DOCUMENTS

| 5,323,470 | A | * | 6/1994 | Kara et al. .................... 382/103 |
| 5,956,465 | A | * | 9/1999 | Takagi et al. ................. 700/255 |
| 7,783,386 | B2 | * | 8/2010 | Merte et al. .................. 700/255 |
| 8,107,058 | B2 | * | 1/2012 | Stein et al. .................... 356/27 |

(Continued)

FOREIGN PATENT DOCUMENTS

| EP | 1306603 | 5/2003 |
| EP | 1738882 | 1/2007 |

(Continued)

OTHER PUBLICATIONS

International Search Report dated Mar. 14, 2012 in connection with International Application No. PCT/EP2011/072337.

*Primary Examiner* — Jason Holloway
(74) *Attorney, Agent, or Firm* — Norton Rose Fulbright US LLP

(57) ABSTRACT

A safety device is described for a handling apparatus, particularly an industrial robot, having at least one movable gripping arm and a gripping device situated on the gripping arm, as well as having a first sensor device, connected to a control device, that is associated with the gripping arm, for collision detection. The first sensor device includes a first recording range. The safety device includes a second sensor device connected to the control device and including a second recording range. The second recording range records a range which has a greater distance from the handling apparatus than the first recording range. Both recording ranges extend outside the handling apparatus.

15 Claims, 2 Drawing Sheets

(56) References Cited

U.S. PATENT DOCUMENTS

| | | | |
|---|---|---|---|
| 8,249,747 B2* | 8/2012 | Kock | B25J 9/1676 318/568.11 |
| 8,315,735 B2* | 11/2012 | Nihei et al. | 700/245 |
| 8,326,590 B2* | 12/2012 | Kock et al. | 703/8 |
| 2003/0076224 A1* | 4/2003 | Braune | 340/500 |
| 2003/0137219 A1* | 7/2003 | Heiligensetzer et al. | 310/328 |
| 2006/0049939 A1* | 3/2006 | Haberer et al. | 340/541 |
| 2008/0021597 A1* | 1/2008 | Merte et al. | 700/255 |
| 2009/0316135 A1* | 12/2009 | Stein et al. | 356/27 |
| 2009/0319081 A1* | 12/2009 | Kock et al. | 700/245 |
| 2011/0264266 A1* | 10/2011 | Kock | B25J 9/1676 700/253 |

FOREIGN PATENT DOCUMENTS

| | | |
|---|---|---|
| JP | 59-081090 | 5/1984 |
| JP | H 03-78002 | 4/1991 |
| JP | H 04-123141 | 4/1992 |
| JP | H 11-58271 | 3/1999 |
| JP | 11-226889 | 8/1999 |
| JP | 2008-200847 | 9/2008 |
| JP | 2010-010116 | 1/2010 |
| JP | 2010-208002 | 9/2010 |
| WO | WO2009155947 | 12/2009 |
| WO | WO2010060475 | 6/2010 |

* cited by examiner

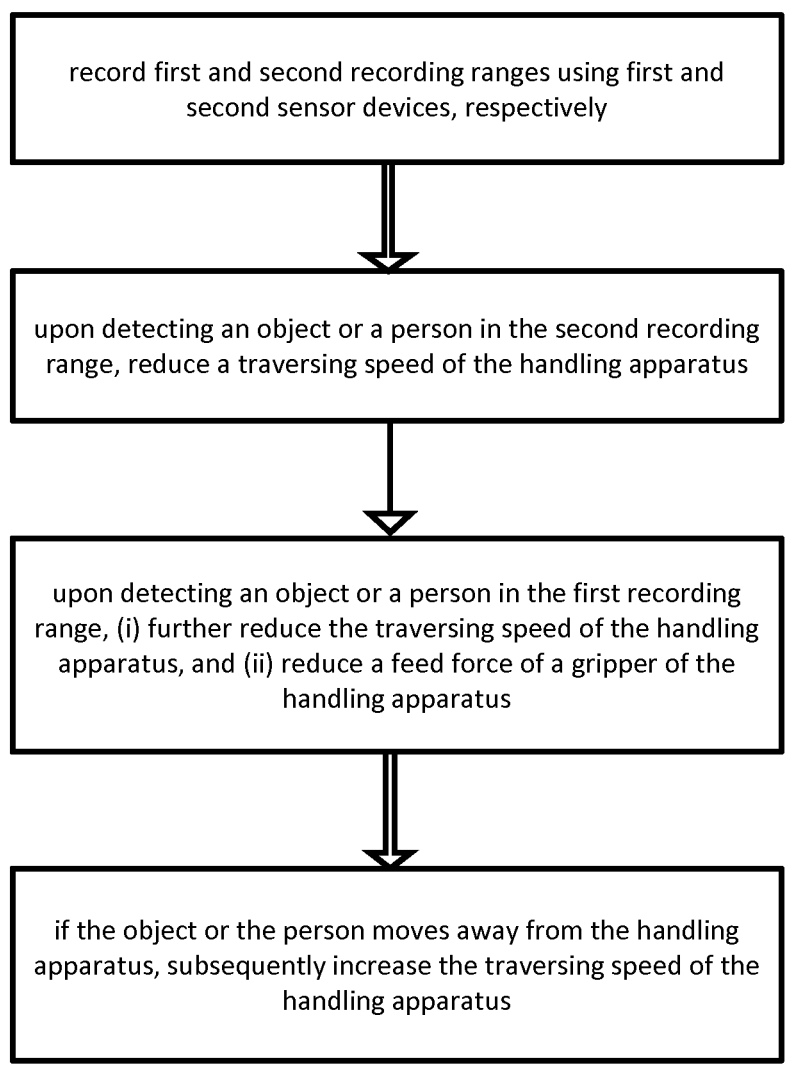

SAFETY DEVICE FOR A HANDLING APPARATUS, IN PARTICULAR AN INDUSTRIAL ROBOT, AND METHOD FOR OPERATING THE SAFETY DEVICE

FIELD OF THE INVENTION

The present invention relates to a safety device for a handling apparatus, especially an industrial robot. The invention also relates to a method for the operation of such a safety device.

BACKGROUND INFORMATION

Such a safety device is known from the European Published Patent Appln. No. EP 1 738 882 A2. In the known safety device, two sensor devices are provided that are independent of each other, of which one sensor device is situated as a tactile sensor device on the gripping arm of an industrial robot, while the other sensor device is developed particularly as a capacitive sensor device, which records a close range about the industrial robot, for instance, a range within 10 cm about the sensor device. This means that the last named sensor device first responds when an object or a person is located at a distance of a moving gripping device that is less than 10 cm. The first named sensor device even first responds only when there has been a collision or touching between the object and the gripping device. The safety device known from European Published Patent Appln. No. 1 738 882 A2 therefore operates particularly safely, to be sure, based on the redundant or duplicated execution of the sensor devices, but early detection of objects approaching the industrial robot, that leads to a targeted speed reduction or collision avoidance between the object and the gripping device is not possible using the previously known safety device. Therefore, the traversing speed of the robot for the safe avoidance of collisions is limited by the range of the close range sensor and the braking distance of the robot.

SUMMARY

Starting from the related art shown, the present invention is based on refining a safety device for a handling apparatus, especially to refine an industrial robot according to the present invention in such a way that thereby, on the one hand, the motion of a gripping arm, for example, is able to be influenced in such a way that a collision with an object is safely avoided and that, on the other hand, in spite of an approach between object and gripping arm, operation of the handling apparatus is made possible, so that a particularly high performance is able to be achieved. This object is attained using a safety device for a handling apparatus, especially an industrial robot. In this context, the present invention is based on the idea of extending the recording ranges of the two sensor devices outside the handling apparatus, so that a timely detection of a possible collision between an object and the handling apparatus is made possible. This opens up the possibility that a motion of the handling apparatus is able to be stopped completely without a collision occurring, or the speed being able to be reduced so that, in spite of the presence of a detected object in the path of motion of the handling apparatus, operation of the handling apparatus is still made possible. It is this that results in a steadily relatively high performance.

In one advantageous embodiment of the present invention, it is conceivable that between the two recording ranges an intermediate zone is developed which is not monitored by either of the two sensor devices. In practice, this means that it is possible to situate a first sensor device at a relatively large distance from the handling apparatus, while a second sensor device only records the close range of the handling apparatus. Thereby, even at a relative large distance between an object and the handling apparatus, a corresponding signal is generated of a possible collision between the object and the handling apparatus, whereby the traversing speed of a gripper, for example, is able to be reduced in time, i.e. possibly having relatively low deceleration speed. Only when the object approaches the handling apparatus in such a way, that it is recorded by the second sensor device, is there a further reduction in the motion speed or the traversing speed of the gripper, perhaps to standstill. This makes possible the advantage that, within the time period in which the presence of an object is determined using the first sensor device, the handling apparatus is able to be operated at a reduced speed or performance, compared to normal operation.

In one further specific embodiment of the present invention, which makes possible a relatively simple construction of the handling apparatus and its gripping arms, it is provided that the second sensor device is situated outside the handling apparatus. This means that the handling apparatus carries only the first sensor device.

In a particularly preferred manner it is provided, in this case, that the second sensor device is situated on a stand. In this context, the stand may carry the handling apparatus, for example. This achieves particularly a relatively simple installation or connection of the second sensor device to the control device of the handling apparatus.

A particularly safe recording of object within the first recording range is achieved if the first sensor device has a plurality of sensor elements working on a capacitive measuring principle, which are particularly situated on the outer surface of the handling apparatus, and enclose it.

In order, with regard to operating safety of the handling apparatus and the recording of possible objects of the collision range, to do justice to the increased requirements, it is additionally provided in an advantageous way, that at least one sensor element of the first and the second sensor device is connected to two evaluation circuits of the control device. Thereby, in practice, two evaluations of the output signals of a sensor element are undertaken, so that, in the case of a deviation between the two evaluations, one may conclude, for example, that there has been a malfunction of the sensor element.

The present invention also includes a method for operating a safety device according to the present invention, for a handling apparatus. In this context, it is provided that, upon the response of the second sensor device for the second recording range, the control device reduces the traversing speed of the handling apparatus compared to a normal operation. By using such a method, collisions may be safely avoided, since the handling apparatus is delayed already in its traversing speed in a range at which the object is still located relatively far from the handling apparatus. Furthermore, because of the reduced traversing speed, nevertheless a normal operation is made possible or an operation having reduced performance of the handling apparatus.

It is quite particularly preferred if the reduction as well as an increase in the traversing speed of the handling apparatus, taking place subsequently, takes place as a function of the currently recorded distance or for the approaching speed of an object or of a person from the path of motion of the handling apparatus. Such an adaptive change of the traversing speed of the handling apparatus makes possible the optimization of the handling apparatus. This also means that the traversing speed and the performance of the handling apparatus approaches again the normal performance or the normal speed and achieves it, in response to the removal of the object from the handling apparatus.

For the sake of safety aspects, it is also additionally provided, particularly preferred, that the respective speed of motion of the handling apparatus is monitored and regulated. This means that the control device not only emits a corresponding signal for a reduction in the traversing speed of the handling apparatus, but that this speed is also monitored within the meaning of a control or regulation.

Increased safety requirements during collisions may additionally be satisfied if, in addition to the reduction in the speed of the handling apparatus, a reduction takes place in the feed force of a gripper. The collision forces acting on an object and a person are reduced thereby, in particular.

Additional advantages, features and details of the present invention derive from the following description of preferred exemplary embodiments as well as from the figures.

BRIEF DESCRIPTION OF THE DRAWINGS

FIG. 3 shows a flowchart illustrating the method according to the present invention.

DETAILED DESCRIPTION

Figure 1:
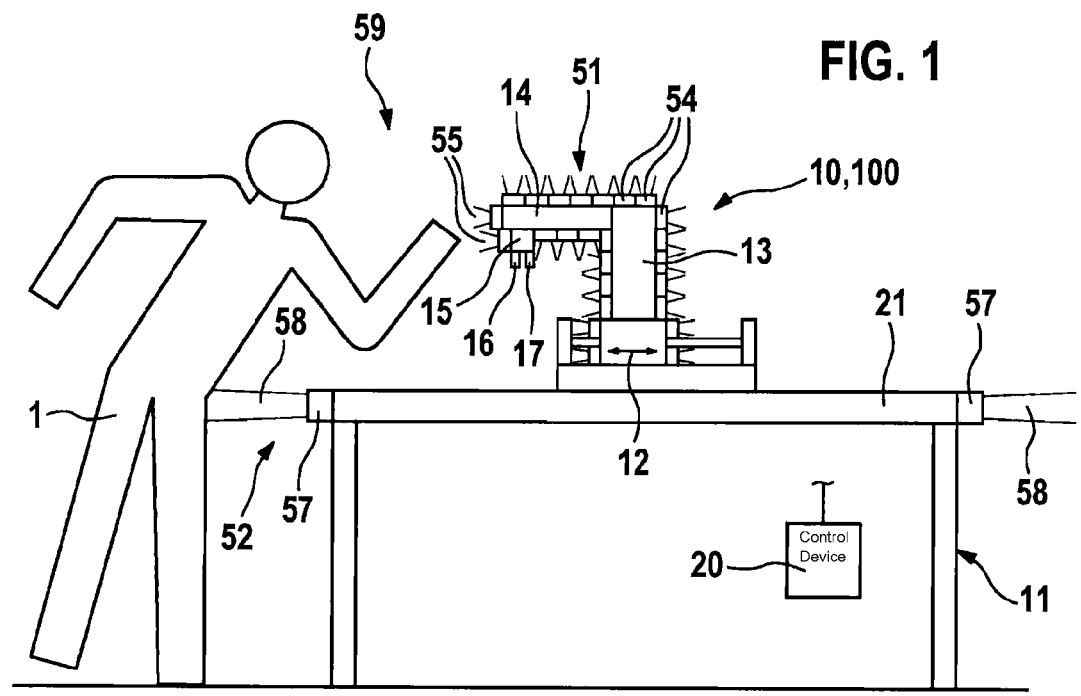
FIG. 1 shows a simplified side view onto a handling apparatus equipped with a safety device according to the present invention.

FIG. 1 shows a handling apparatus 10 in the form of an industrial robot 100. In this context, industrial robot 100 is situated on a stand 11 as a table unit. Industrial robot 100 has a column 13 that is movable in the direction of double arrow 12, a horizontally situated arm 14 being fastened to one end of column 13. Arm 14, in turn, carries a gripper 15 that is, for instance, movable up and down as well pivotable, having two gripping fingers 16, 17. Using a handling apparatus 10 developed in such a way, one is able to transfer component parts situated on stand 11, for example, to a second position, so that an assembly process of various parts may be carried out.

In such a fully automatic and programmed assembly process, handling apparatus 10 has a control device 20, in which the various paths of motion and sequences of motion of industrial robot 100, especially of gripper 15 and its gripping fingers 16, 17 are stored and programmed.

What is critical in such fixedly programmed sequences of motion of handling apparatus 10 is that, in the case of collisions with objects, such as objects located on table 11, for example, but not provided to be there, or in the case of a collision with a person 1, there may be damage to components of handling apparatus 10 and possible injury to person 1. In order to avoid this, handling apparatus 10 according to the present invention has a safety device 50. Safety device 50 is developed as a two-stage safety device 50 having two independent sensor devices 51, 52. In this case, both sensor devices 51, 52 are connected to control device 20.

In the exemplary embodiment, first sensor device 51 monitors the direct close range about industrial robot 100. For this it is provided that first sensor device 51 has a plurality of first sensor elements 54, which are situated and fastened on the outside of industrial robot 100, i.e. particularly on column 13, arm 14 as well as gripper 15, and enclose these. First sensor elements 54 are preferably designed as capacitive sensor elements 54, that is, they respond as soon as an object or a person 1 is located within a first recording range 55 of first sensor elements 54. In this connection, the range of first sensor elements 54 or their recording range 55 amounts to at most 20 cm, as a rule.

Second sensor device 52 has a plurality of second sensor elements 57 shown in FIG. 1. Second sensor elements 57 are situated, in this case, for example, on table 11, particularly in the range of table plate 21, their second recording range 58 monitoring or covering a space that is outside table plate 21 or table 11. The situation of second sensor device 52 may, however, also be in front of table 11, for instance, by standing on the floor. The development of second sensor elements 57 may be either as a capacitive sensor or, for example, as an ultrasonic sensor or in another manner.

One may further see in FIG. 1 that, between second recording range 58 and first recording range 55, an intermediate area 59 is developed which is not monitored either by first sensor device 51 nor by second sensor device 52. The size or the situation of intermediate area 59 comes about from the situation of first sensor element 54 and second sensor element 57, as well as their alignment and the range of recording ranges 55, 58.

Figure 2:
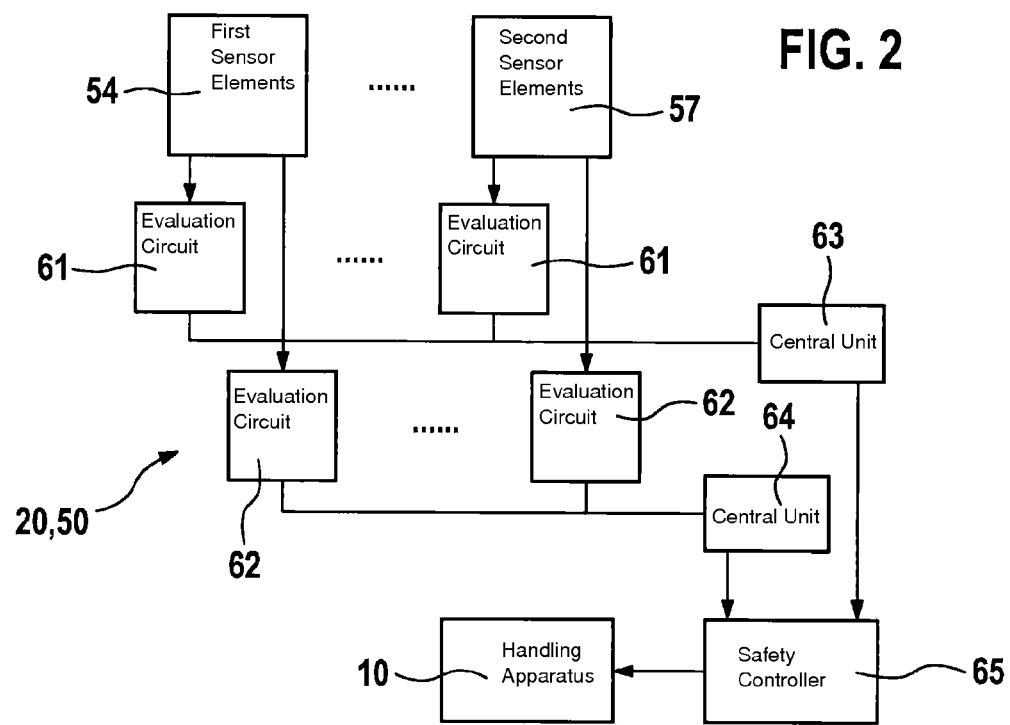
FIG. 2 shows a block diagram for explaining the evaluation of the measuring signals generated by the sensor elements of the safety device.

In FIG. 2, one may see that control device 20 has two different evaluation circuits 61, 62 for the signals of first and second sensor elements 54, 57. The outputs of the two evaluation circuits 61, 62 are each connected via a central unit 63, 64 to a safety controller 65, which, in turn, actuates handling apparatus 10, especially their drives, that are not shown.

For instance, one may recognize, in each case with the aid of a first sensor element 54 and a second sensor element 57, that each of the two sensor elements 54, 57 is connected to the two evaluation circuits 61, 62. In this connection, it may be provided, for instance, that the measuring values recorded at regular time intervals by first and second sensor elements 54, 57 are supplied as input values alternately to the two evaluation circuits 61, 62, so that a plausibility check of the measuring values is able to be carried out. Using such a development of control device 20, changes in first and second recording ranges 55, 58 of the two sensor devices 51, 62 are recognized, particularly whether suddenly objects or persons 1 are present in recording range 55, 58.

It is provided, according to the method of the present invention which is illustrated in the flowchart of FIG. 3, that during recording of a subject or a person 1 by second sensor device 52, that is, in the far region of handling apparatus 10, the traversing speed of industrial robot 100, especially its grippers 15, is reduced via safety controller 65. This is used so that, in the case of an additional approach of the object or the person 1, industrial robot 100 is able to be stopped in its motion down to its standstill, before there is a collision with the object or with person 1.

As long as the object or person 1 is located in a region in which only second sensor device 52 responds, i.e. particularly in second recording range 58 or in the intermediate area 59, this means that no direct collision danger exists with the object or person 1. In this case, handling apparatus 10 or industrial robot 100 may be operated further with reduced performance as a result of lowered performance.

If the object or person 1 further approaches industrial robot 100, this is recorded by first sensor element 54 of first sensor device 51. In this region there is direct collision danger between the object or person 1 and industrial robot 100 on the path of motion of gripper 15. In this case, the motion speed and the traversing speed of gripping arm 15 may be further reduced perhaps as a function of the actually recorded distance of the object or person 1 from the respective first sensor element 54, perhaps down to a complete standstill.

In this connection, during the operation of handling apparatus 10, the actual speed or the traversing speed of industrial robot 100 or its gripping arm 15 is monitored and regulated. Furthermore, it may be provided, particularly when an object or a person 1 is recorded by first sensor device 54, that the pushing force of gripper 15 is reduced, in order to reduce the collision force in response to a possible collision.

As soon as the object or person 1 distances itself/himself again from handling apparatus 10, control device 20 again undertakes an increase in the traversing speed of gripper 15, until handling apparatus 10 once again reaches normal performance and normal traversing speed, for the case in which neither of the two sensor devices 51, 52 records an object or a person 1.

Handling apparatus 10 described up to this point may be adapted or modified in various ways, without deviating from the idea of the present invention. This idea is made up of a two-step detection of approaching objects or persons 1 into the action range or into the path of motion of industrial robot 100, whereupon it undertakes an appropriate reduction or increase of the traversing speed of its gripper 15. Thus it is conceivable, for example, to apply the present invention in electrically or pneumatically driven axial systems, instead of to an industrial robot 100. In the former, based on the missing path control, it may be required to carry out the speed reduction down to a standstill, in response to a danger of collision.

What is claimed is:

1. A safety device for a handling apparatus that includes at least one movable gripping arm, comprising:
    a control device;
    a first sensor device connected to a control device and associated with the gripping arm for collision detection, the first sensor device having a first recording range starting from the handling apparatus and ending at a first recording range end position remote from the handling apparatus; and
    a second sensor device connected to the control device and having a second recording range starting from a second recording range starting position remote from the handling apparatus and ending at a second recording range end position remote from the handling apparatus, wherein the second recording range starting position is locatable, along a direction from the handling apparatus that is the same as a direction of the first recording range from the handling apparatus, at a location that is further removed from the handling apparatus than the first recording range end position for all operating positions of the handling apparatus.

2. The safety device as recited in claim 1, wherein the handling apparatus includes an industrial robot.

3. The safety device as recited in claim 1, wherein a gripping device is situated on the gripping arm.

4. The safety device as recited in claim 1, wherein an intermediate zone is developed between the first and second recording ranges, the intermediate zone not monitored by either of the first and second sensor devices.

5. The safety device as recited in claim 1, wherein the second sensor device is situated outside the handling apparatus.

6. The safety device as recited in claim 5, wherein the second sensor device is situated on a stand.

7. The safety device as recited in claim 1, wherein:
    the first sensor device includes a plurality of first sensor elements working on a capacitive measuring principle, and
    the first sensor elements are situated on an outside surface of, and enclose, the handling apparatus.

8. The safety device as recited in claim 1, wherein at least one sensor element from each of the first and the second sensor devices, respectively, is connected to two evaluation circuits of the control device.

9. A method for operating a safety device for a handling apparatus, the safety device including a first sensor device connected to a control device and a second sensor device connected to the control device, the first sensor device including a first recording range that is different than a second recording range of the second sensor device, the first recording range starting from the handling apparatus and ending at a first recording range end position remote from the handling apparatus, and the second recording range starting from a second recording range starting position remote from the handling apparatus and ending at a second recording range end position remote from the handling apparatus, wherein the second recording range starting position is locatable, along a direction from the handling apparatus that is the same as a direction of the first recording range from the handling apparatus, at a location that is further removed from the handling apparatus than the first recording range end position for all operating positions of the handling apparatus, the method comprising:
    upon a response of the second sensor device for the second recording range, reducing by the control device a traversing speed of the handling apparatus compared to a normal operation.

10. The method as recited in claim 9, wherein the handling apparatus includes an industrial robot.

11. The method as recited in claim 10, further comprising:
    wherein the reduction as well as an increase in the traversing speed of the handling apparatus takes place as a function of one of a currently recorded distance and for an approaching speed of one of an object and a person from the path of motion of the handling apparatus.

12. The method as recited in claim 11, wherein the increase in the traversing speed takes place again subsequently.

13. The method as recited in claim 9, further comprising:
    monitoring and regulating the traversing speed of the handling apparatus.

14. The method as recited in claim 9, further comprising:
    in addition to reducing the traversing speed of the handling apparatus, reducing a feed force of a gripper.

15. The method of claim 9, further comprising:
    upon detection of an object in the first recording range by the first sensor device, further reducing the motion speed of at least a gripping arm of the handling apparatus as a function of an actually recorded distance of the object from the first sensor device until the gripping arm reaches a complete standstill.

* * * * *